United States Patent [19]
Hayter et al.

[11] 4,379,222
[45] Apr. 5, 1983

[54] HIGH SPEED SHIFT REGISTER

[75] Inventors: Alan B. Hayter; Bernard L. Reagan, Jr., both of Ithaca, N.Y.

[73] Assignee: NCR Corporation, Dayton, Ohio

[21] Appl. No.: 180,186

[22] Filed: Aug. 21, 1980

[51] Int. Cl.³ .............................................. G06F 5/04
[52] U.S. Cl. ....................................... 377/81; 377/73
[58] Field of Search ................ 235/92 SH; 307/221 R

[56] References Cited
U.S. PATENT DOCUMENTS
3,333,255 7/1967 Loev ............................... 235/92 SH
3,851,187 10/1974 Pao et al. ........................ 307/221 R FOREIGN PATENT DOCUMENTS
2134806 5/1978 Fed. Rep. of Germany ........ 235/92

OTHER PUBLICATIONS
TTL Data Book, Texas Instruments Inc., 2nd Edition, 1976, pp. 6-89 thru 6-92.

Primary Examiner—Gareth D. Shaw
Assistant Examiner—Stephen A. Soffen
Attorney, Agent, or Firm—J. T. Cavender; Albert L. Sessler, Jr.; George Jameson

[57] ABSTRACT

A high speed shift register device includes first and second shift registers. Odd numbered bits of a word are stored in the first shift register and even numbered bits of the word are stored in the second shift register. The first shift register is clocked by a clock signal, and the second shift register is clocked by the complement of the clock signal. The outputs of the first and second shift registers are alternately shifted by means of a multiplexer to an output conductor. A control input of the multiplexer is connected to the clock input. Data is shifted out of the multiplexer at a rate which is twice the normal shifting rate of each of the first and second shift registers.

10 Claims, 4 Drawing Figures

HIGH SPEED SHIFT REGISTER

BACKGROUND OF THE INVENTION

The invention relates to high speed shift registers, and more particularly, to devices and methods for high speed shifting of data out of shift registers.

DESCRIPTION OF THE PRIOR ART

Shift registers have been utilized as serial memories for many years in a wide variety of applications. One application in which serial memories are presently utilized is for storing information which is outputted to a cathode ray tube (CRT). Charge coupled device (CCD) memories can be utilized for storage of information which is serially inputted to a cathode ray tube. Digital information is shifted from the CCD memories into scanning circuitry associated with the horizontal and vertical scanning rates of the scanning circuitry. In order to accomplish this shifting, a high speed buffer is needed to receive data in parallel format from the CCD memory and serially output that data to the CRT system. For one particular CRT system, there is a need for a 20 bit shift register device capable of receiving 20 bits in parallel format from a 20 bit bus and shifting this information into the CCD memory at a sixty megahertz rate. However, in order to implement such a shift register device, it is necessary to have a clock signal having a sixty megahertz frequency. The most economical and popular family of high speed logic circuits is the TTL (transistor-transistor logic) family. However, commercially available TTL shift registers ordinarily are incapable of reliable operation at clock frequencies in excess of 35 megahertz. Although there are commercially available shift registers of the ECL (emitter-coupler logic) logic family capable of operating at clock frequencies of 60 megahertz, it is unduly expensive and inconvenient to implement an ECL shift register and a 60 megahertz clock in a TTL system for a variety of reasons, including the high costs of implementing additional power supplies required by ECL circuitry. Consequently, until now, there has been no economical means of implementing the above mentioned high speed shift register device.

Accordingly, it is an object of the invention to provide a high speed shift register device capable of shifting data at a rate substantially greater than the maximum clock frequency at any individual shift registers included in the shift register device.

It is another object of the invention to provide a shift register device capable of shifting data at twice the clock frequency of any clock signal inputted to the shift register device.

SUMMARY OF THE INVENTION

Briefly described, and in accordance with one embodiment thereof, the invention provides a high speed shift register device capable of receiving input data in parallel format and shifting the data out in serial format at a rate which is twice the frequency of a clock signal applied to the shift register device. The shift register device includes a first register which shifts data stored therein in response to the leading or rising edge of each pulse of a first clock signal, and also includes a second shift register which shifts data stored therein in response to the leading edge of each pulse of a second clock signal. Each of the first and second shift registers is capable of having data loaded in parallel format into that shift register. The second clock signal is the logical complement of the first clock signal. In the described embodiment of the invention the first and second clock signals are generated by a high speed logic circuit, wherein there is no more than approximately 3.5 nanoseconds delay between leading edges of pulses of the first clock signal and trailing edges of corresponding pulses of the second clock signal. In operation, the odd numbered bits of a digital word are loaded into respective adjacent bits of the first shift register, and the even numbered bits of the digital word are loaded into respective adjacent bits of the second shift register. The serial data shifted out of the first shift register in response to the first clock signal is logically combined with the second clock signal to produce a first signal. The serial data shifted out of the second shift register in response to the second clock signal is logically combined with the first clock signal to produce a second signal. The first and second signals are logically combined to produce a third signal which constitutes the digital word in serial format, odd numbered bits of the digital word being shifted onto an output conductor in response to each rising edge of the first clock signal. The even numbered bits of the digital word are shifted onto the output conductor in response to each rising edge of the second clock signal.

DESCRIPTION OF THE INVENTION

Figure 1A:
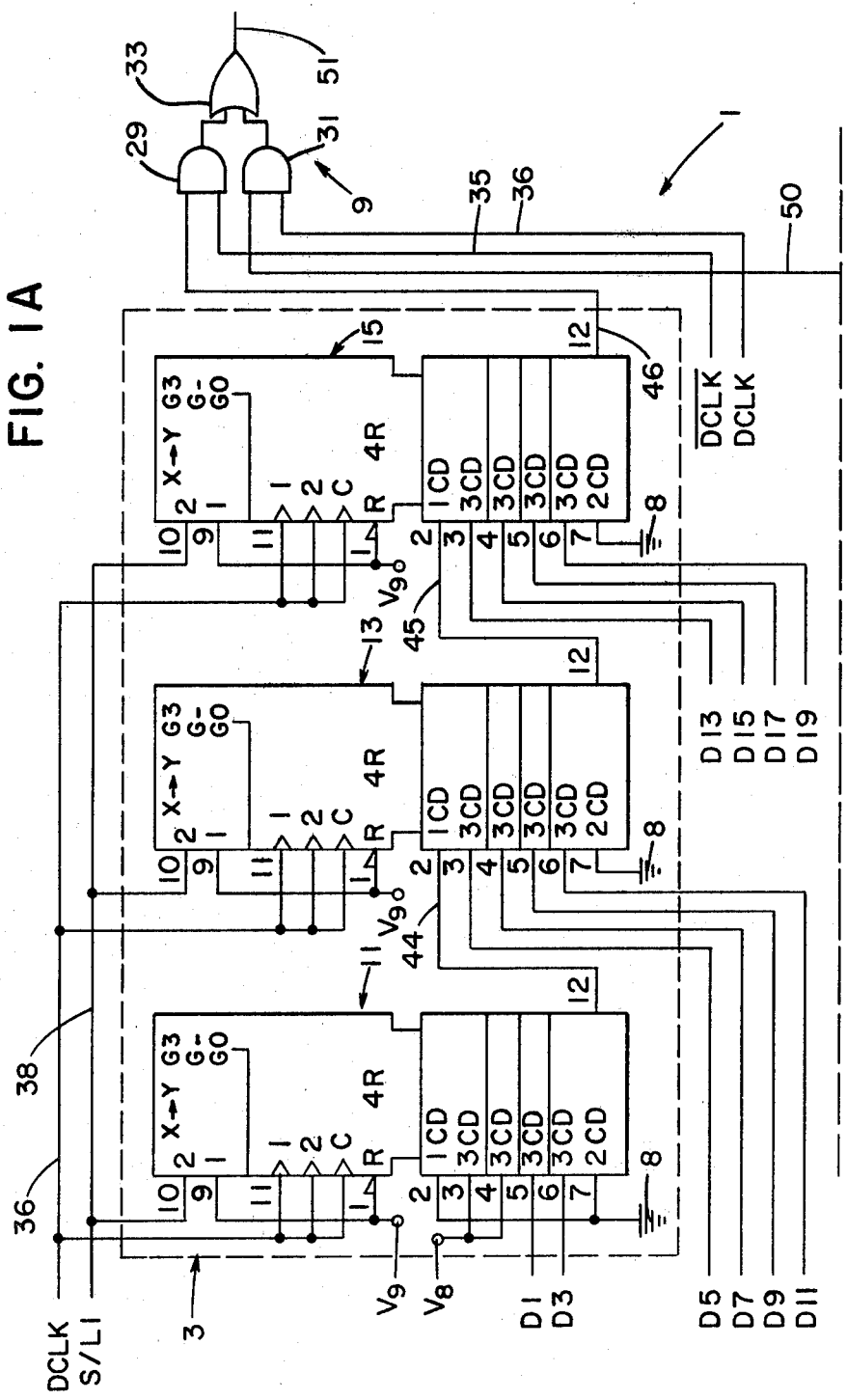
FIGS. 1A and 1B, taken together, show the circuitry for a presently preferred embodiment of the invention.

Referring now to FIG. 1A, high speed shift register 1 includes a first ten bit shift register 3, referred to herein as the "odd" shift register because it is loaded with the odd-numbered bits of a 20 bit word. High speed shift register 1 also includes a second shift register 5 (FIG. 1B), referred to herein as the "even" shift register because it is loaded with the even-numbered bits of the 20 bit word. High speed shift register 1 includes a clock circuit 7, shown in FIG. 2, for generating a clock signal DCLK on conductor 36 and a complement clock signal $\overline{DCLK}$ on conductor 35. Odd shift register 3 is implemented by means of three four-bit TTL "parallel in, serial out" TTL integrated circuit shift registers 11, 13 and 15. Four-bit shift registers 11, 13 and 15 are connected in series. The input leads 3 and 4 of four-bit shift register 11 are connected to positive supply voltage conductor $V_8$, so that the series connection of 4 bit shift registers 11, 13 and 15 has ten operative bits. The input leads 2 and 7 of shift register 11 are the left and right serial inputs thereof and are connected to ground conductor 8, since no left and right data signals are serially inputted to shift register 11.

Similarly, even shift register 5 (FIG. 1B) is implemented by means of three four-bit shift registers 17, 19 and 21 connected in series. The input leads 3 and 4 of shift register 17 are connected to the positive supply voltage conductor $V_8$, while the input leads 2 and 7 are connected to ground conductor 8.

The parallel data inputted to odd shift register 3 (FIG. 1A) includes the odd-numbered bits of a 20 bit parallel word, which bits are conducted on ten conductors designated as bits D1, D3, D5, D7, D9, D11, D13, D15, D17 and D19. The lead numbers of the four-bit shift registers 11, 13, etc., are identified in FIGS. 1A and 1B, the four-bit TTL shift registers being implemented by means of Texas Instruments 74S194 four-bit universal shift register integrated circuits. Referring again to FIG. 1A, bits D1 and D3 of the 20-bit word are conducted to input leads 5 and 6, respectively, of four-bit TTL shift register 11. Bits D5, D7, D9 and D11 are conducted to input leads 3, 4, 5 and 6 of four-bit TTL shift register 13. The serial data output of each of the above mentioned four-bit shift registers is produced on lead 12 thereof. The serial data input lead of each of the four-bit TTL shift registers is at lead 2 thereof. The serial data output 12 of four-bit shift register 11 is connected by means of conductor 44 to the serial data input 2 of four-bit shift register 13.

Bits D13, D15, D17 and D19 of the above-mentioned 20-bit word are connected to leads 3, 4, 5 and 6 of four-bit shift register 15, respectively. The serial data output lead 12 of four-bit shift register 13 is connected by means of conductor 45 to the serial data input lead 2 of four-bit shift register 15. The serial data output lead 12 of four-bit register 15 is connected by means of conductor 46 to one input of a two-input AND gate 29. The other input of two-input AND gate 29 is connected to $\overline{DCLK}$ conductor 35.

The clock inputs of each of four-bit shift registers 11, 13 and 15 are connected to DCLK conductor 36. A shift/load signal designated S/L1 is applied to lead 10 of each of the four-bit shift registers by means of conductor 38. The reset input lead 1 of each of the four-bit shift registers is connected to a positive supply voltage $V_9$ as shown in FIG. 1A. (This connection can be easily supplied by those skilled in the art, and need not be discussed in detail.)

Figure 1B:
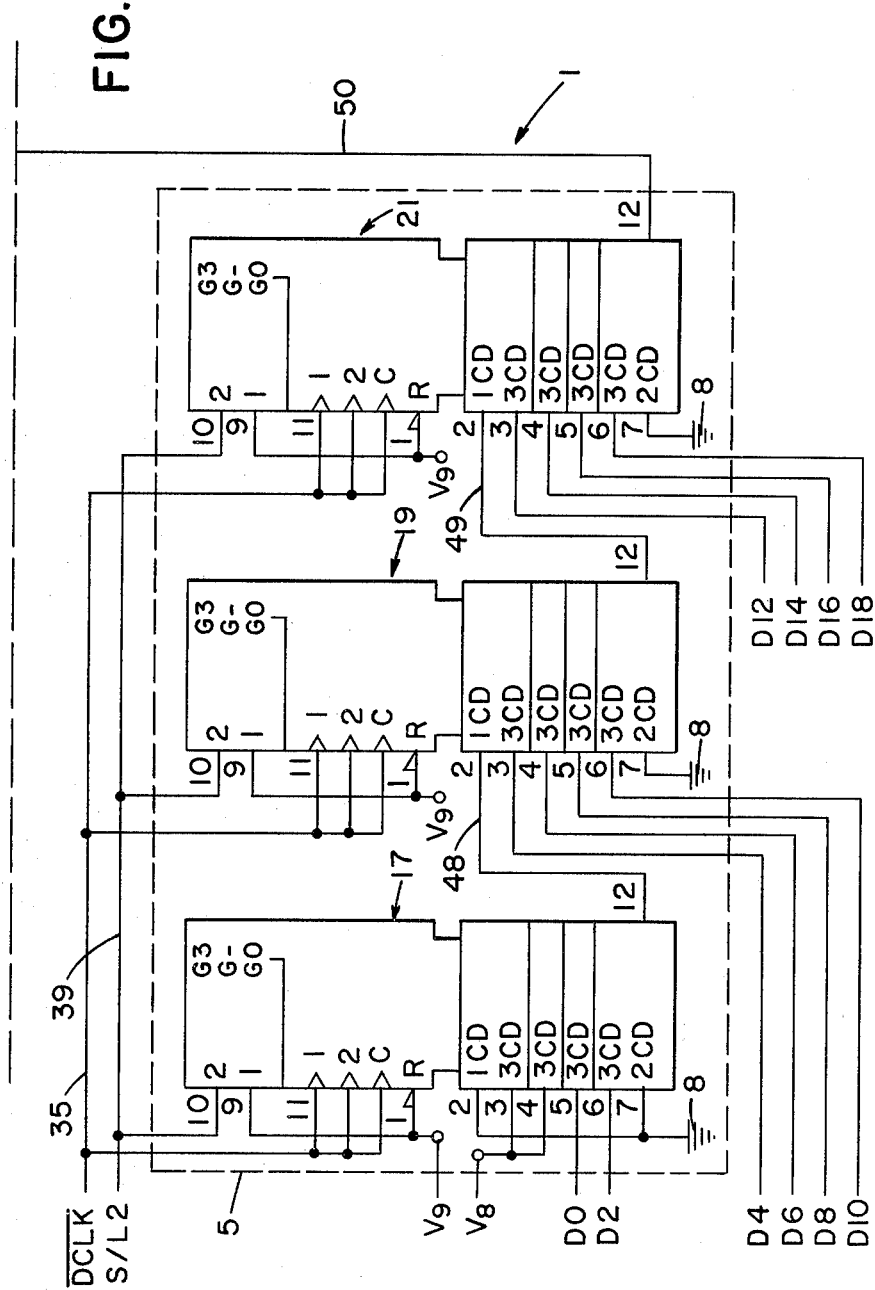

Referring now to FIG. 1B, the even-numbered bits of the above-mentioned 20 bit word are conducted on ten conductors which are designated as bits D0, D2, D4, D6, D8, D10, D12, D14, D16 and D18. Bits D0 and D2 are connected to input leads 5 and 6 of four-bit shift register 17, the other two parallel data input leads 3 and 4 of four-bit shift register 17 being connected to a positive voltage $V_8$ so that only two bits of shift register 17 are utilized. Two input leads 2 and 7 of shift register 17 are the left and right serial inputs thereof and are connected to ground conductor 8. The serial data output lead 12 of four-bit shift register 17 is connected by means of conductor 48 to the serial data input of four-bit shift register 19, leads 3, 4, 5 and 6 of which conduct bits D4, D6, D8 and D10 respectively.

The serial data output lead 12 of four-bit shift register 19 is connected by means of conductor 49 to the serial data input lead 2 of four-bit shift register 21, input leads 3, 4, 5, and 6 of which conduct bits D12, D14, D16, and D18 respectively of the 20-bit word.

It should be noted that the same reference characters D1, D2, D3, etc., are utilized herein to identify both the respective bits of the 20-bit word and the corresponding conductors of the parallel bus conducting those bits.

The serial data output lead 12 of four-bit shift register 21 is connected by means of conductor 50 to one input of two-input AND gate 31, the other input of which is connected to $\overline{DCLK}$ conductor 36. The two AND gates 29 and 31, in combination with two-input OR gate 33, form a logic circuit 9, the output of which is the above-mentioned 20 bit word D0, D1, D2 . . . D19, which is serially shifted onto conductor 51. The outputs of AND gates 29 and 31 are connected to the two inputs of OR gate 33, the output of which is connected to conductor 51.

Logic circuit 9 can be implemented by means of a Texas Instruments 74S51 integrated circuit.

Figures 2, 3:
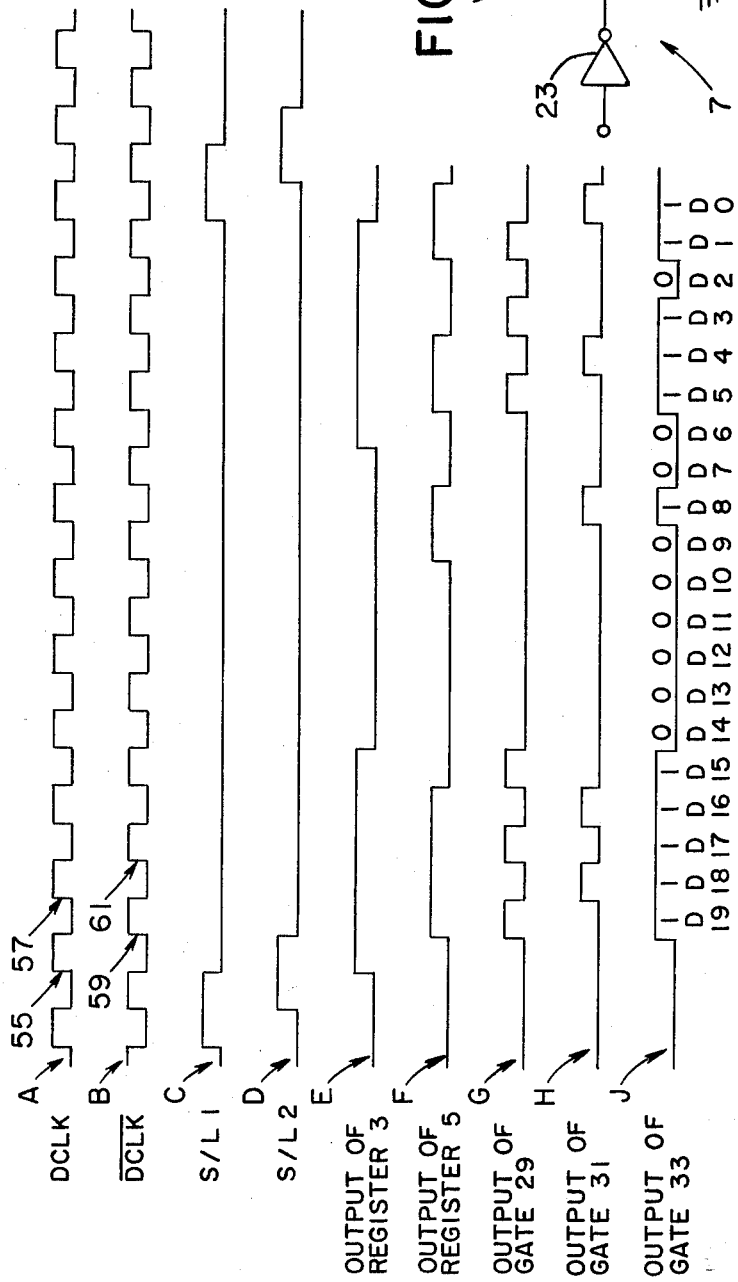
FIG. 2 shows the circuitry for generating the first and second clock signals.
FIG. 3 is a timing diagram useful in explaining the operation of the embodiment of the invention shown in FIGS. 1A and 1B.

Referring now to FIG. 2, clock generator circuitry 7 includes an inverter 23, which can be implemented by means of a Texas Instruments 74S04 integrated circuit inverter. Exclusive OR gates 25 and 27 each have one input connected to the output of inverter 23. The ramaining input of exclusive OR gate 25 is connected to a positive voltage supply $V_8$, and the remaining input of exclusive OR gate 27 is connected to ground conductor 8. Exclusive OR gate 25 inverts the signal received from inverter 23, while exclusive OR gate 27 produces a non-inverted output of the signal received from the inverter 23. This causes exclusive OR gate 25 to produce the complement of the signal received from the inverter 23 on conductor 35, and causes exclusive OR gate 27 to produce a non-inverted signal on conductor 36. Exclusive OR gates 25 and 27 can be implemented by means of a Texas Instruments 74S86 integrated circuit.

It should be noted that the maximum acceptable delay between the rising edge of DCLK and the corresponding falling edge of $\overline{DCLK}$ is 3.5 nanoseconds. Greater delays result in race conditions which cause improper operation of logic circuit 9, thereby producing erroneous output data on conductor 51.

Lead 10 of each of the above-mentioned four-bit shift registers shown in FIG. 1B is a shift/load signal designated S/L2 which is utilized via conductor 39 to determine whether that shift register is operating in its shift mode or its load mode. Lead 9 of each of the four-bit shift registers 17, 19, and 21 is an input which controls whether that shift register shifts data therein to the right or left. As shown in FIG. 1B, lead 9 is connected to a positive supply voltage $V_9$ so that each shift register always shifts its data to the right. Lead 11 of each four-bit shift register is a clock input. Lead 2 of each four bit shift register is the right serial input thereof and lead 7 is the left serial input thereof, which lead is connected to ground conductor 8 for each shift register.

The operation of the circuit of FIGS. 1A and 1B can be best understood with reference to the timing diagram shown in FIG. 3. In FIG. 3, waveform A depicts the DCLK waveform, which may have a frequency of 30 megahertz. Waveform B depicts $\overline{DCLK}$, the complement of waveform A. The maximum delay between a leading edge of waveform A and a corresponding trailing edge of waveform B is approximately 3.5 nanoseconds. Waveform C is the S/L1 waveform applied to conductor 38 in FIG. 1A. Waveform D is the S/L2 waveform applied to conductor 39 in FIG. 1B. Waveform E depicts the output of shift register 3 which appears on conductor 46 and is referred to as the "odd" waveform in FIG. 1A, since the odd numbered bits D1, D3, D5, etc., of the above mentioned 20-bit word are conducted on conductor 46. Waveform F depicts the output of shift register 5 which appears on conductor 50 in FIG. 1B, and is referred to as the "even" waveform since the even numbered bits D0, D2, D4, etc., are conducted on conductor 50. Waveform G depicts the output of AND gate 29. Waveform H depicts the output of AND gate 31. Waveform J is the output of OR gate 33 at conductor 51. Waveforms E-J of FIG. 3 are the waveforms which result when a sample 20-bit binary word D0, D1 ..., D19 having a value of 11011100100000011111 is loaded in parallel format into high speed shift register 1 of FIGS. 1A and 1B and is shifted out at a 60-megahertz rate, assuming that the frequency of DCLK is 30 megahertz.

In accordance with the present invention, ten-bit even shift register 5 (FIG. 1B) is loaded with a word D0, D2, D4, ... D18, i.e., with the word 1010100011 and odd shift register 3 (FIG. 1A) is loaded with the word D1, D3, D5 ... D19, i.e., with the word 1110000111.

As can be seen in FIG. 3, each positive-going S/L1 pulse is followed by ten DCLK pulses, before occurrence of another S/L1 pulse. Similarly, each positive-going S/L2 pulse is followed by ten $\overline{DCLK}$ pulses. When the rising edge 55 of DCLK occurs, D1, D3, D5 ... D19 are simultaneously loaded into ten-bit shift register 3, outputting bit D19 onto conductor 46. At the time of the next rising edge of DCLK (indicated in FIG. 3 by arrow 57) occurs, shift register 3 (FIG. 1A) begins outputting the remaining data stored therein, shifting D17 onto conductor 46 into one input of AND gate 29. One shift of data in shift register 3 occurs for each rising edge of DCLK for nine consecutive pulses thereof, including the pulse indicated by arrow 57. The contents of shift register 3 are shifted out in the order D19, D17, ..., D1.

Similarly, shift register 5 (FIG. 1B) is loaded with bits D0, D2, D4 ... D18 at the time of rising edge 59 of $\overline{DCLK}$; the contents of shift register 5 are then shifted onto conductor 50, one bit at a time, for each of the pulses of DCLK beginning with the pulse having the leading edge indicated by arrow 61. The contents of shift register 5 are shifted out in the order D18, D16, D14, etc.

Consequently, it can be readily seen that the D19 bit is shifted out of high speed shift register 1 (FIGS. 1A and 1B) first; then the D18 bit is shifted out, and then the D17 bit is shifted out, etc. It will be recalled that the logic circuit or multiplexer 9 ANDs the "odd" numbered bits D1, D3 ... D19 on conductor 46 with $\overline{DCLK}$ in AND gate 29 and ANDs the "even" numbered bits D0, D2 ... D18 on conductor 50 with DCLK in AND gate 31. Logic circuit or multiplexer 9 then logically ORs the outputs of AND gates 29 and 31 in OR gate 33 to serially produce the 20-bit word D0, D1, D2 ... D19 on conductor 51 at a shift frequency which is twice the frequency of the DCLK signal. This occurs because a shift of data from one of shift registers 3 and 5 occurs, in effect, at the time of every rising edge and at the time of every falling edge of DCLK, even through the four-bit shift registers 11, 13, etc., are all capable of shifting only on the rising edge of the clock signal inputted thereto. Thus, the objective of obtaining a 60 megahertz data shifting rate with a 30 megahertz clock utilizing all commercially available TTL circuitry has been achieved by the above described circuitry.

It can be easily verified by one skilled in the art that waveforms E-J represent the signals appearing on conductors 46, 50, the outputs of AND gate 29, AND gate 31, and conductor 51, respectively, for the above-mentioned example.

While the invention has been described with reference to a particular embodiment thereof, those skilled in the art will be able to make various modifications to the described embodiment of the invention without departing from the true spirit and scope thereof, as set forth in the appended claims. For example, other types of logic circuits than the TTL set forth in the foregoing example can be utilized. The basic concept set forth above can be utilized to enable high speed shifting of data out of any parallel loadable shift register which causes data to serially shift on only one edge of a clock signal for each cycle of the clock signal.

We claim:

1. A high speed shift register circuit comprising in combination:

first shift register means having a first output conductor, said first shift register means being responsive to a leading edge of a first clock signal for serially shifting data in said first shift register means onto said first output conductor;

second shift register means having a second output conductor, said second shift register means being responsive to a leading edge of a second clock signal for serially shifting data in said second shift register means onto said second output conductor;

means for producing said first and second clock signals, said second clock signal being the logical complement of the first clock signal, the delay between a leading edge of said first clock signal and a corresponding trailing edge of said second clock signal being less than a predetermined value;

first means for logically combining a signal on said first output conductor with said second clock signal to produce a first signal;

second means for logically combining a signal on said second output conductor with said first clock signal to produce a second signal; and third means having a third output conductor, said third means being responsive to the signals produced by said first and second means for producing a third signal wherein data contained in said first and second shift register means is interleaved and serially shifted onto said third conductor at a rate which is equal to a multiple of the frequency of said first clock signal.

2. The high speed shift register circuit of claim 1 further including fourth means for parallel loading of a first group of data bits into said first shift register means and fifth means for parallel loading of a second group of data bits into said second shift register means.

3. The high speed shift register circuit of claim 2 wherein said first group of data bits includes the odd numbered bits of a data word and wherein said second group of data bits includes the even numbered bits of said data word.

4. The high speed shift register circuit of claim 3 wherein said first shift register means shifts said odd numbered bits onto said first output conductor in response to rising edges of said first clock signal, and said second shift register means shifts said even numbered bits onto said second output conductor in response to rising edges of said second clock signal.

5. The high speed shift register circuit of claim 4 wherein said predetermined value is approximately three and one-half nanoseconds.

6. The high speed shift register circuit of claim 5 wherein said first and second means includes TTL AND gates and said third means includes a TTL OR gate, and wherein said first and second shift register means are implemented by TTL circuitry.

7. The high speed shift register circuit of claim 6 wherein said first clock signal has a frequency of approximately thirty megahertz.

8. A method for converting a data word in parallel format to serial format and for serially shifting the data word at a high rate, said method comprising the steps of:
  (a) loading the odd numbered bits of said data word into a first shift register and loading the even number bits of said data word into a second shift register;
  (b) applying a first clock signal to a clock input of said first shift register and applying a second clock signal to a clock input of said second shift register, said second clock signal being the logical complement of said first clock signal;
  (c) shifting successive ones of said odd numbered bits of said data word out of said first shift register in response to leading edges of successive pulses of said first clock signal, and shifting successive ones of said even numbered bits of said data word out of said second shift register in response to the leading edges of successive pulses of said second clock signals;
  (d) logically combining the odd numbered bits shifted out of said first shift register with said second clock signal;
  (e) logically combining the even numbered bits shifted out of said second shift register with said first clock signal; and
  (f) logically combining the logic signals produced as a result of steps (d) and (e) to produce said data word in said serial format.

9. The method of claim 8 wherein the delay between the leading edges of said first clock signals and the corresponding trailing edges of said second clock signals is approximately three and one-half nanoseconds.

10. The method of claim 8 wherein said first clock signal has a frequency of approximately 30 megahertz.

* * * * *